(12) United States Patent
Tanozaki et al.

(10) Patent No.: US 6,710,476 B2
(45) Date of Patent: Mar. 23, 2004

(54) ELECTROMAGNETIC RECIPROCAL DRIVE MECHANISM

(75) Inventors: Masaaki Tanozaki, Niigataken (JP); Takayuki Minagawa, Niigataken (JP); Takeshi Suzuki, Niigataken (JP); Hideto Urasawa, Niigataken (JP)

(73) Assignee: Twinbird Corporation (JP)

( * ) Notice: Subject to any disclaimer, the term of this patent is extended or adjusted under 35 U.S.C. 154(b) by 169 days.

(21) Appl. No.: 09/903,048

(22) Filed: Jul. 11, 2001

(65) Prior Publication Data
US 2002/0014937 A1 Feb. 7, 2002

(30) Foreign Application Priority Data
Jul. 28, 2000 (JP) .......................................... 2000-229760

(51) Int. Cl.$^7$ .............................................. H02K 31/16
(52) U.S. Cl. ........................ 310/30; 310/17; 310/156.28
(58) Field of Search ............................ 310/15, 17, 20, 310/23, 30, 34, 156.28, 156.31

(56) References Cited

U.S. PATENT DOCUMENTS

| | | | | |
|---|---|---|---|---|
| 4,944,975 A | * | 7/1990 | Sheer | 428/36.1 |
| 6,047,461 A | * | 4/2000 | Miura et al. | 29/598 |
| 6,085,527 A | * | 7/2000 | Woollenweber et al. | 60/607 |
| 6,215,206 B1 | * | 4/2001 | Chitayat | 310/12 |

FOREIGN PATENT DOCUMENTS

| | | | |
|---|---|---|---|
| JP | 7-31113 A | * | 1/1995 |
| JP | 2000-266421 | | 9/2000 |
| JP | 2000-274854 | | 10/2000 |
| JP | 2000-337725 | | 12/2000 |
| JP | 2001-57767 | | 2/2001 |

* cited by examiner

Primary Examiner—Burton S. Mullins
Assistant Examiner—Judson H. Jones
(74) Attorney, Agent, or Firm—Akerman Senterfitt (57) ABSTRACT

The invention provides an electromagnetic reciprocal drive mechanism having a movable part that is simple to manufacture, dimensionally stable and inexpensive. The device has; a permanent magnet cluster 3, and a spider 4 and retainer 5 that concentrically support the permanent magnet cluster 3, an outer laminated core 6 provided adjacent to the permanent magnet cluster 3, and an electromagnetic coil 8 wound around the outer laminated core 6. An adhesive paper sheet 13 having an adhesive layer 11 on an inner surface and which can be impregnated with an adhesive 12 is wrapped around an outer periphery of the permanent magnet cluster 3, the spider 4 and the retainer 5. The adhesive 12 is then impregnated into the adhesive paper sheet 13 and solidified. In the adhesive paper sheet 13 and the adhesive layer 11 is formed of a plurality of small holes. By impregnating application of a small amount of the adhesive 12 into the adhesive paper sheet 13 and then solidifying, the outer periphery of the spider 4, the retainer 5 and the permanent magnet cluster 3 is reinforced by the adhesive paper sheet 13. Therefore not only is manufacture simple, but it can be constructed inexpensively.

2 Claims, 7 Drawing Sheets

ELECTROMAGNETIC RECIPROCAL DRIVE MECHANISM

BACKGROUND OF THE INVENTION

1. Field of the Invention

The present invention relates to an electromagnetic reciprocal drive mechanism such as a linear motor, and in particular to the construction of a movable part thereof.

2. Description of the Related Art

Heretofore, as such an electromagnetic reciprocal drive mechanism there is known one which has for example, a permanent magnet, a support for supporting the permanent magnet, a laminated core provided adjacent to the permanent magnet, and an electromagnetic coil wound around the laminated core. Moreover, the construction is such that an alternating field is formed for example by flowing an alternating current through the electromagnetic coil, and the permanent magnet reciprocates within this alternating field. There is also a mechanism where the permanent magnets are cylindrically arranged to give a permanent magnet cluster. In this case, since permanent magnet pairs repel each other, a woven cloth is wound around the outer periphery of the permanent magnet cluster and the support. Further, the permanent magnet cluster and the support are reinforced by applying an epoxy resin type adhesive from on top of this woven cloth, and impregnating and solidifying the resin therein. The woven cloth that is wound around the permanent magnet cluster and the support, is cut out at appropriate positions after applying the adhesive.

However, in these electromagnetic reciprocal drive mechanisms, the fabrication operation is difficult because the woven cloth stretches due to the application of adhesive, so that there is the likelihood of wrinkles appearing in the woven cloth, and also the possibility that the woven cloth may slip. In addition, because the woven cloth frays in the application of the adhesive, and in particular, the edge of the woven cloth tends to curl up because of the adhesive, dimensional stability in the radial direction is poor. Moreover, there is a problem in that when polyaramid (Kevlar grade) woven cloth is used to ensure strength, because the permeability of the epoxy resin type adhesive is low, then after applying and impregnating a large amount of adhesive, the excess adhesive must be scraped away. Thus not only is a large amount of adhesive necessary, but also because the polyaramid as well as the epoxy resin are both high strength materials, cutting is difficult. Hence these problems are likely to be factors in increasing the cost of such electromagnetic reciprocal drive mechanisms.

SUMMARY OF THE INVENTION

It is the object of the present invention to solve the above problem, and provide an electromagnetic reciprocal drive mechanism having a movable part that is simple to manufacture, dimensionally stable and inexpensive.

The electromagnetic reciprocal drive mechanism of the present invention has; a permanent magnet cluster with plate like permanent magnets cylindrically arranged, a support for concentrically supporting the permanent magnet cluster, a laminated core provided adjacent to the permanent magnet cluster, and an electromagnetic coil wound around the laminated core, wherein a sheet having an adhesive layer on an inner surface and which can be impregnated with an adhesive is wrapped around an outer periphery of the permanent magnet cluster and the support, and the permanent magnet cluster is secured to the support by impregnating an adhesive into the sheet and solidifying.

By constructing the invention in this manner, then by wrapping the sheet that is cut according to pre-measurements so that it cannot overlap when wrapping, around the outer periphery of the support and the cylindrically arranged permanent magnets, the sheet is temporarily fixed to the permanent magnets and the support by the adhesive layer. Moreover, by applying and impregnating a small amount of adhesive into the sheet and solidifying, the outer periphery of the support and the permanent magnet cluster is reinforced by the sheet.

In addition, the electromagnetic reciprocal drive mechanism of this invention, is one where in a first aspect, a material of the sheet is paper.

By constructing the invention in this manner, cutting the sheet is not only easy, but there are no distortions produced at the time of wrapping, and fraying of the fiber does not occur when applying the adhesive.

Moreover, the electromagnetic reciprocal drive mechanism of the present invention, is one where in either one of the first and second aspects, a plurality of small holes are formed in the sheet and adhesive layer.

By constructing the invention in this manner, the applied adhesive directly reaches the support and the permanent magnets from the small holes.

BRIEF DESCRIPTION OF THE DRAWINGS

FIG. 2 is a cross-section on line A—A of FIG. 1 which illustrates the embodiment of the present invention, while

FIG. 3 is a cross-section on line B—B of FIG. 1 which illustrates the embodiment of the present invention, while

FIG. 4 is a schematic cross section of an electromagnetic reciprocal drive mechanism illustrating the embodiment of the present invention, while FIG. 4a is a partly enlarged section thereof.

FIG. 5 shows steps 1 to 4 in a manufacturing method for a permanent magnet cluster, illustrating the embodiment of the present invention, FIG. 5(A) to FIG. 5(D) being cross-sections of steps 1 to 4.

FIG. 6 shows steps 5 to 8 in the manufacturing method for the permanent magnet cluster, illustrating the embodiment of the present invention, FIG. 6(A) to FIG. 6(D) being cross-sections of steps 5 to 8.

DESCRIPTION OF THE PREFERRED EMBODIMENTS

As shown in the figures, an electromagnetic reciprocal drive mechanism 1 comprises; an annular spider 4 being a base end support member for concentrically supporting a base end of a permanent magnet cluster 3 formed as a short cylinder by arranging a plurality of permanent magnets 2, an annular retainer 5 being a tip end support member for concentrically supporting a tip end of the permanent magnet cluster 3, outer and inner laminated cores 6 and 7 respectively provided adjacent to the outer periphery and inner periphery of the permanent magnet cluster 3, and an electromagnetic coil 8 wound around the outer laminated core 6.

Figure 1:
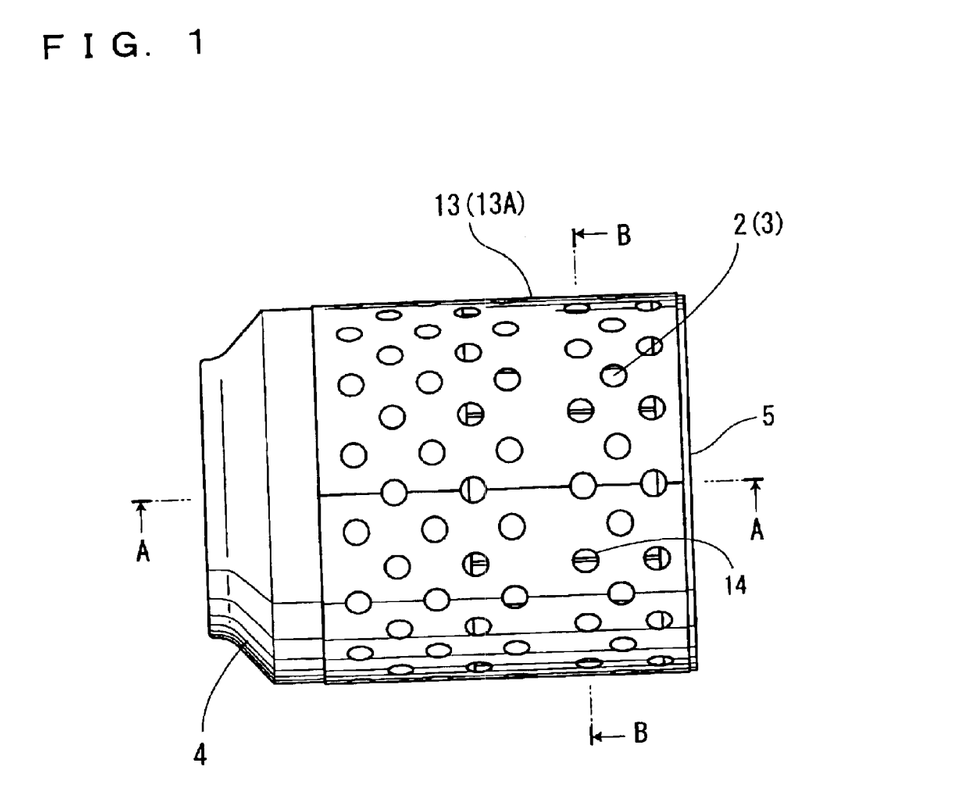
FIG. 1 is an elevation view of main parts illustrating an embodiment of the present invention.
Figure 2:
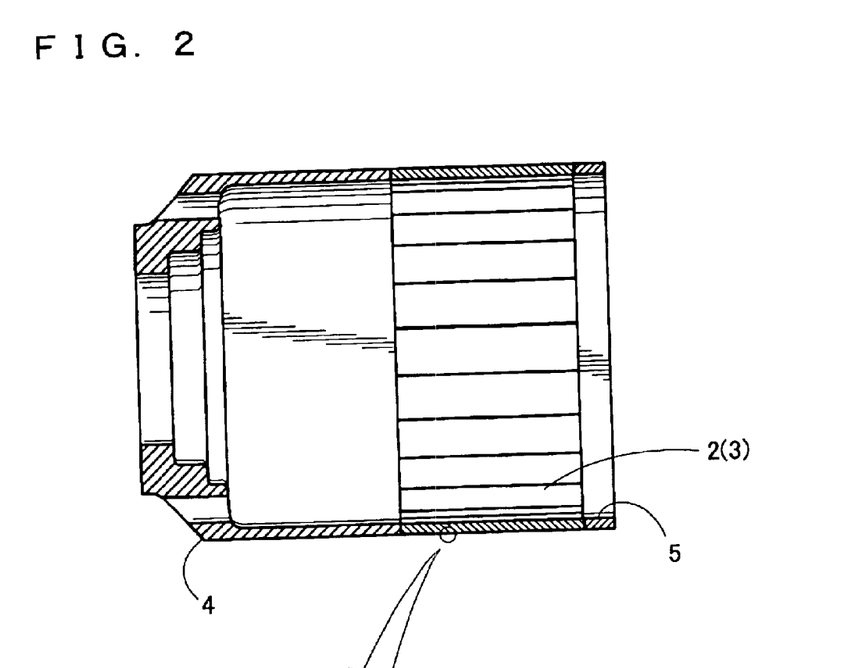
Figure 2A:
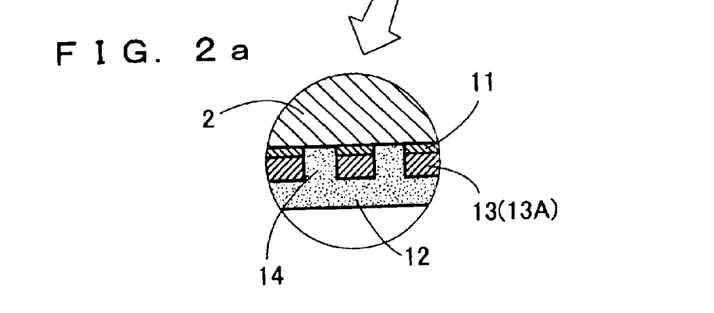
FIG. 2a is a partly enlarged section thereof.
Figure 3:
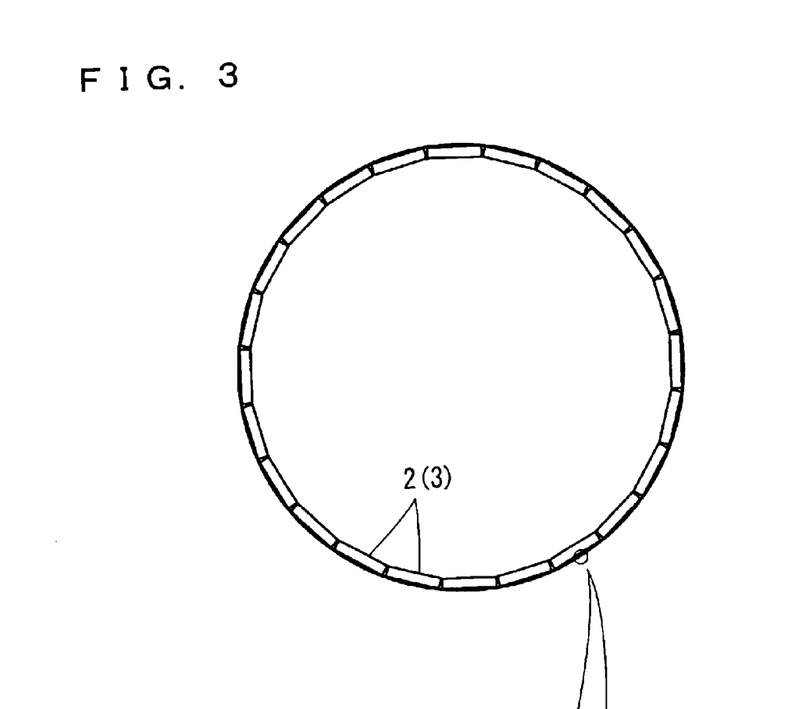
Figure 3A:
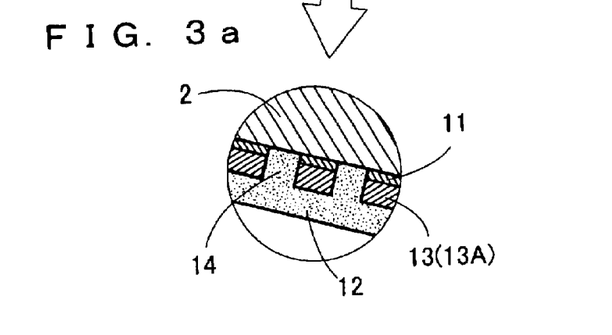
FIG. 3a is a partly enlarged section thereof.
Figures 4, 4A:
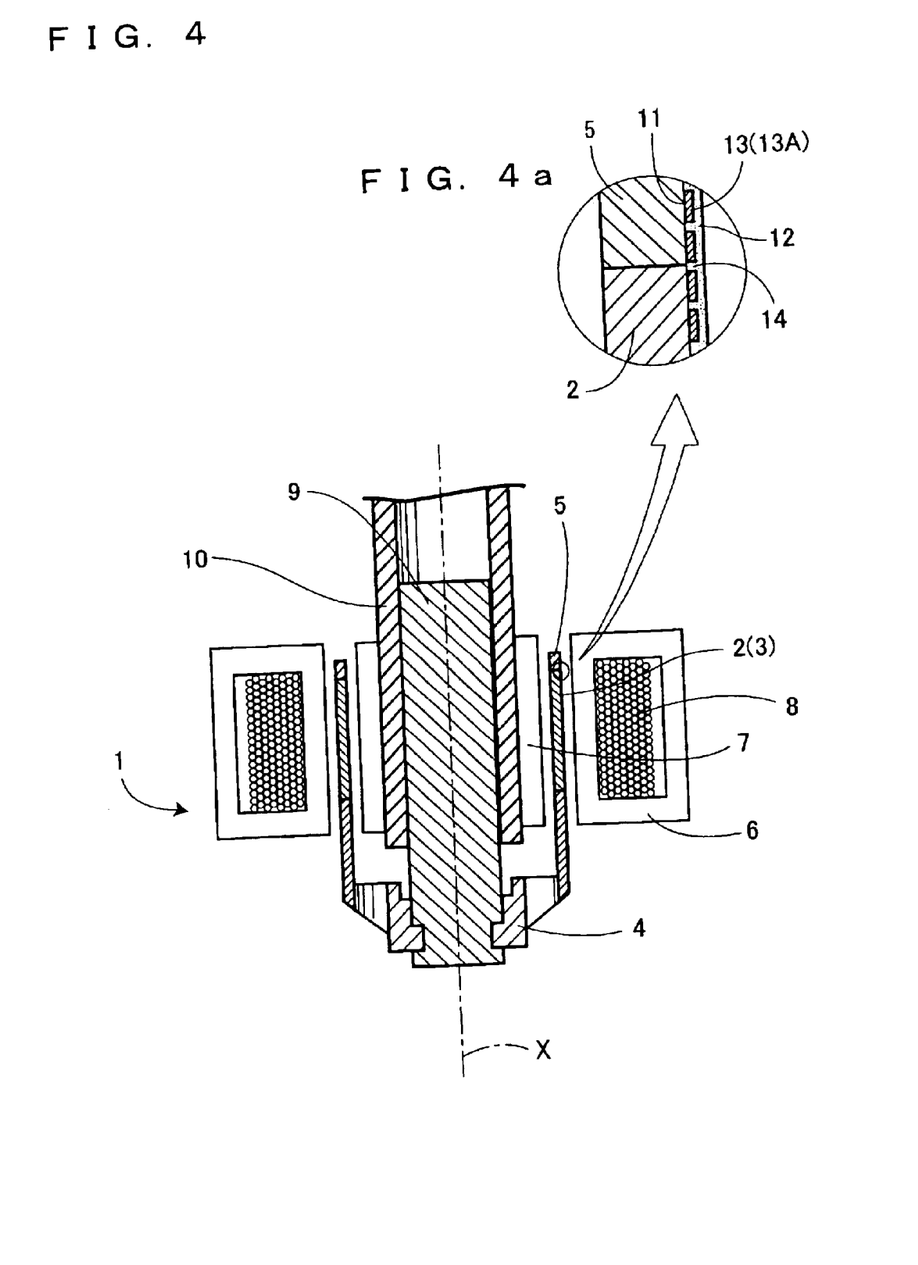

In addition, the permanent magnet cluster 3 is formed by arranging a plurality of permanent magnets 2 of plate shape, in an approximately cylindrical configuration so as to surround a piston 9. As mentioned above, each permanent magnet 2 is a plate shape. Moreover, since as shown in FIG. 3, each adjoining permanent magnet 2 is arranged at respective equal angles (in this example 165 degrees), the permanent magnet cluster 3 forms a regular polygon cylinder (in this example a twenty four-sided polygon) when viewed in the axial direction. The permanent magnets 2 are comprised for example of rare earth, iron, or boron permanent magnets and are molded by sintering, and magnetized so that one side surface, in other words the outer periphery is a N-pole and the other side surface, in other words the inner periphery, is a S-pole. Moreover, the outer and inner laminated cores 6 and 7 are constructed by building up laminations of non-oriented magnetic steel formed as thin plates made into the same shape by stamping with a press. Then, the laminations are arranged radially to form the outer and inner laminated cores 6 and 7 in a cylinder shape. The piston 9 is installed concentrically with the permanent magnet cluster 3, the spider 4 and the retainer 5, so as to be able to move reciprocally in the X-axis direction inside a cylinder 10.

The permanent magnet cluster 3 is secured to the spider 4 and the retainer 5 by wrapping an adhesive paper sheet 13, having an adhesive layer 11 on an inner surface being one surface of a paper sheet 13A made of pulp, and which can be impregnated with an adhesive 12, about respective outer peripheries of the permanent magnet cluster 3, the spider 4 and the retainer 5, and then impregnating the adhesive 12 into the adhesive paper sheet 13 and solidifying. In the adhesive paper sheet 13 and the adhesive layer 11 on the inner surface thereof, a plurality of circular small holes 14 are formed by piercing.

Preferably the adhesive paper sheet 13 satisfies the following conditions. Namely, firstly, the surface is not frayed and will not fray even if rubbed. Secondly, the thickness is 0.10 mm plus or minus around 0.01 mm and of uniform thinness. Thirdly, epoxy resin type adhesive permeates satisfactorily. Fourthly, a coating that will block the permeation of the adhesive is not used on the surface. Moreover, on the inside surface of the adhesive paper sheet 13, an adhesive layer 11 with a thickness of approximately 0.03 mm is formed. In addition, the small holes 14 multiply provided over the entire adhesive paper sheet 13 have a diameter of approximately 2 mm. Then an abutting portion 4A of the permanent magnet 2 and the spider 4, and an abutting portion 5A of the permanent magnet 2 and the retainer 5 are bonded using an epoxy resin type adhesive 15. Moreover, for the adhesive 12 that impregnates the adhesive paper sheet 13, an epoxy resin type adhesive of a type where the viscosity decreases markedly with heat is used.

Figure 5A:
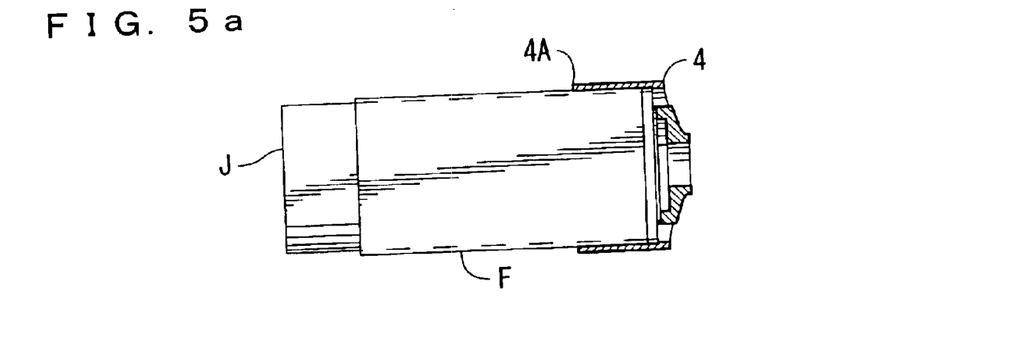
Figure 5B:
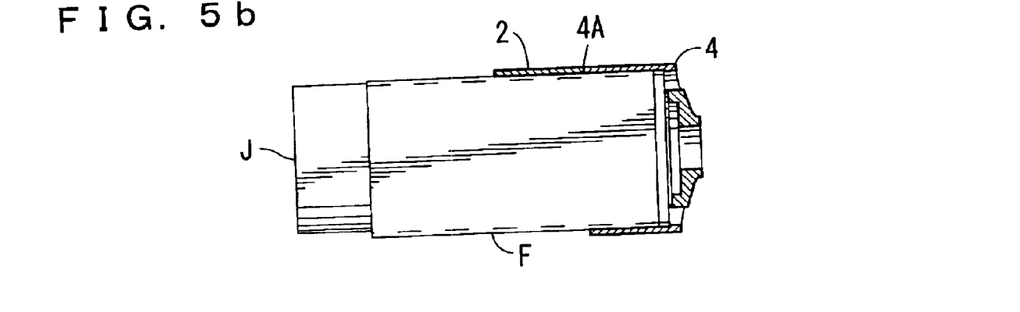
Figure 5C:
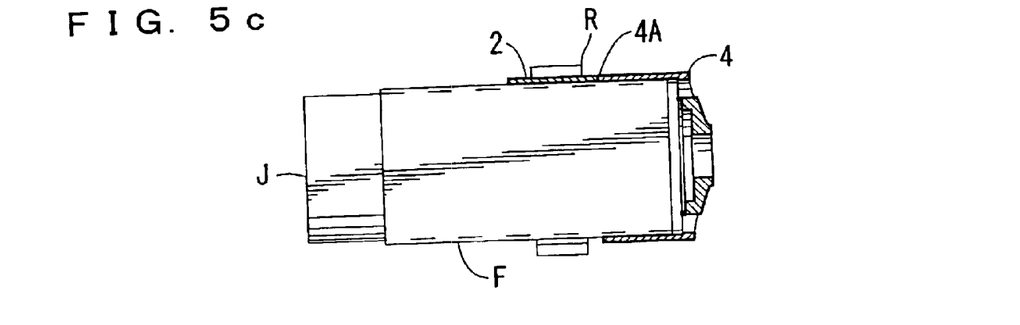
Figure 5D:
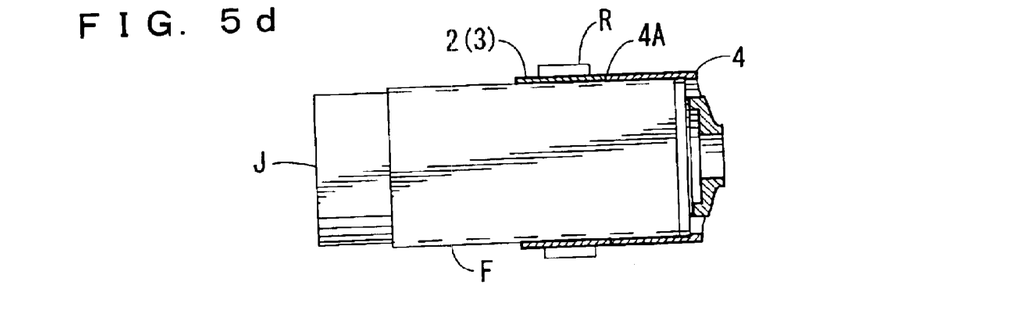
Figure 6A:
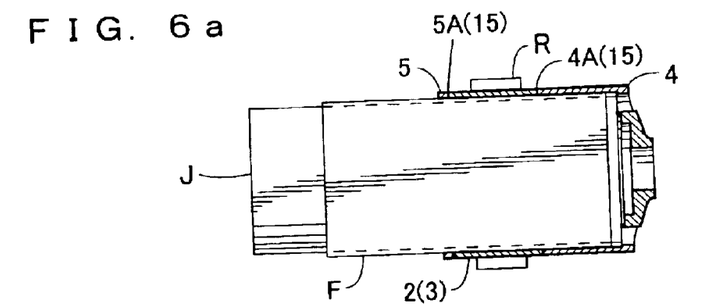

Next is a description of a manufacturing method of the permanent magnet cluster 3, and of how to mount the same to the spider 4. At first, as shown in FIG. 5(A), a polyethylene resin type film F is wrapped around a jig J, which is then inserted into the spider 4 from the tip end of the spider 4. This jig J is formed of a ferromagnet such as iron, in a cylindrical shape with a diameter slightly smaller than the inside diameter of the spider 4. Then, as shown in FIG. 5(B), permanent magnets 2 are attached magnetically to the jig J, that is, these are attached by the magnetic force between the two members, and the base ends thereof are abutted against the abutting portion 4A of the spider 4. At this time, so that permanent magnet 2 pairs are not mutually repelled, the permanent magnets 2 are installed with an appropriate space therebetween (for example at one magnet spacing). Then, as shown in FIG. 5(C), an annular magnet securing jig R is arranged concentrically with the jig J on the outer periphery of the jig J. This magnet securing jig R has an inside diameter so as to be able to clamp the permanent magnets 2 between the magnet securing jig R and the outer periphery of the jig J. Then, as shown in FIG. 5(D), the remaining permanent magnets 2 are inserted along the axial direction of the jig J, between the jig J, the magnet securing jig R and the previously attached permanent magnets 2, and the base ends of the permanent magnets 2 are abutted against the abutting portion 4A of the spider 4. In this condition, the permanent magnet 2 pairs repel each other, with the force acting from the center of the permanent magnet cluster 3 towards the outside. However, the permanent magnets 2 are magnetically attached to the ferromagnetic jig J, and are held by the magnet securing jig R. The permanent magnets 2 are then similarly installed one by one, and once all the permanent magnets 2 have been installed, then as shown in FIG. 6(A), the retainer 5 is fitted to the tip end of the permanent magnets 2.

Figure 6B:
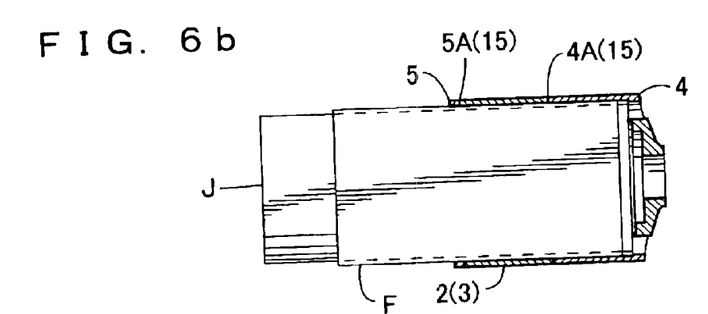
Figure 6C:
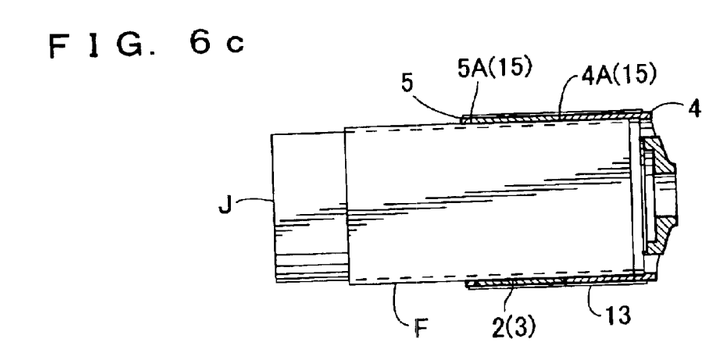

After this, the epoxy resin type adhesive 15 is applied to the abutting portion 4A of the permanent magnets 2 and the spider 4 and the abutting portion 5A of the permanent magnets 2 and the retainer 5, and the assembly is then placed inside a solidification promoting kiln (not shown in the drawings) and solidified. Further, the adhesive 15 penetrates into the inner peripheral side of the permanent magnet cluster 3 from between the permanent magnets 2 and the spider 4 and retainer 5, and solidifies in a condition with the part between the permanent magnet cluster 3 and the aforementioned resin film F filled up. Then after the adhesive 15 has solidified, the assembly of the permanent magnet cluster 3 supported by the jig J and the magnet securing jig R is taken from the kiln, and after any excessive adhesive has been taken off, the magnet securing jig R is removed from the outer periphery of the permanent magnet cluster 3 as shown in FIG. 6(B). Then in addition, as shown in FIG. 6(C), an adhesive paper sheet 13 that is pre-cut to fit the outer peripheral dimensions of the permanent magnet cluster 3, wherein an adhesive layer 11 is formed on the inner surface of a long narrow tape of paper sheet 13A, and a backing paper (not shown in the drawings) has been peeled off from the adhesive layer 11, is attached to the outer periphery of the permanent magnet cluster 3, the spider 4 and the periphery of retainer 5, to temporarily secure these. In doing this, opposite end portions of the adhesive paper sheet 13 are positioned on top of a permanent magnet 2, and not on the join between the permanent magnet 2 pairs. Then, after applying a small amount of epoxy resin type adhesive 12 to the entire adhesive paper sheet 13, this is heated with an industrial drier. The epoxy resin type adhesive 12 that is used here is a type where the viscosity decreases markedly with heat. Because of this, by heating the adhesive 12 with an industrial drier, the adhesive 12 permeates thoroughly through the adhesive paper sheet 13, and even a small amount of adhesive 12 will permeate into an entire adhesive paper sheet. In addition, the adhesive 12 reaches directly from the small holes 14 provided in the adhesive paper sheet (paper sheet 13), to the permanent magnet 2, the spider 4 and the retainer 5, permeates to the inner peripheral side of the permanent magnet cluster 3 from between the permanent magnet 2 pairs, and fills the space between the permanent magnet cluster 3 and the resin film F and then solidifies. Moreover, when excess adhesive 12 that has oozed out is removed, the surface of the adhesive paper sheet 13 is wiped or rubbed, but even in this situation the surface of the adhesive paper sheet 13 will not fray.

Figure 6D:
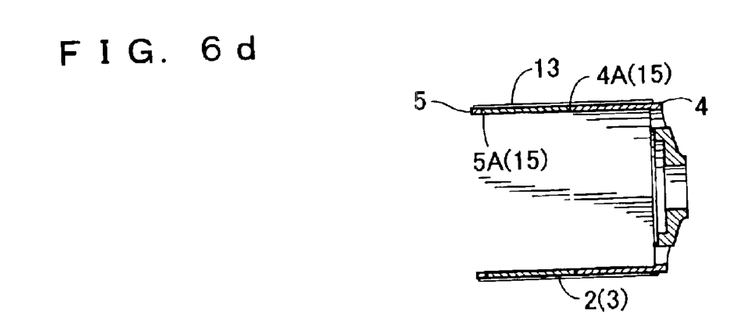
Figure 7:
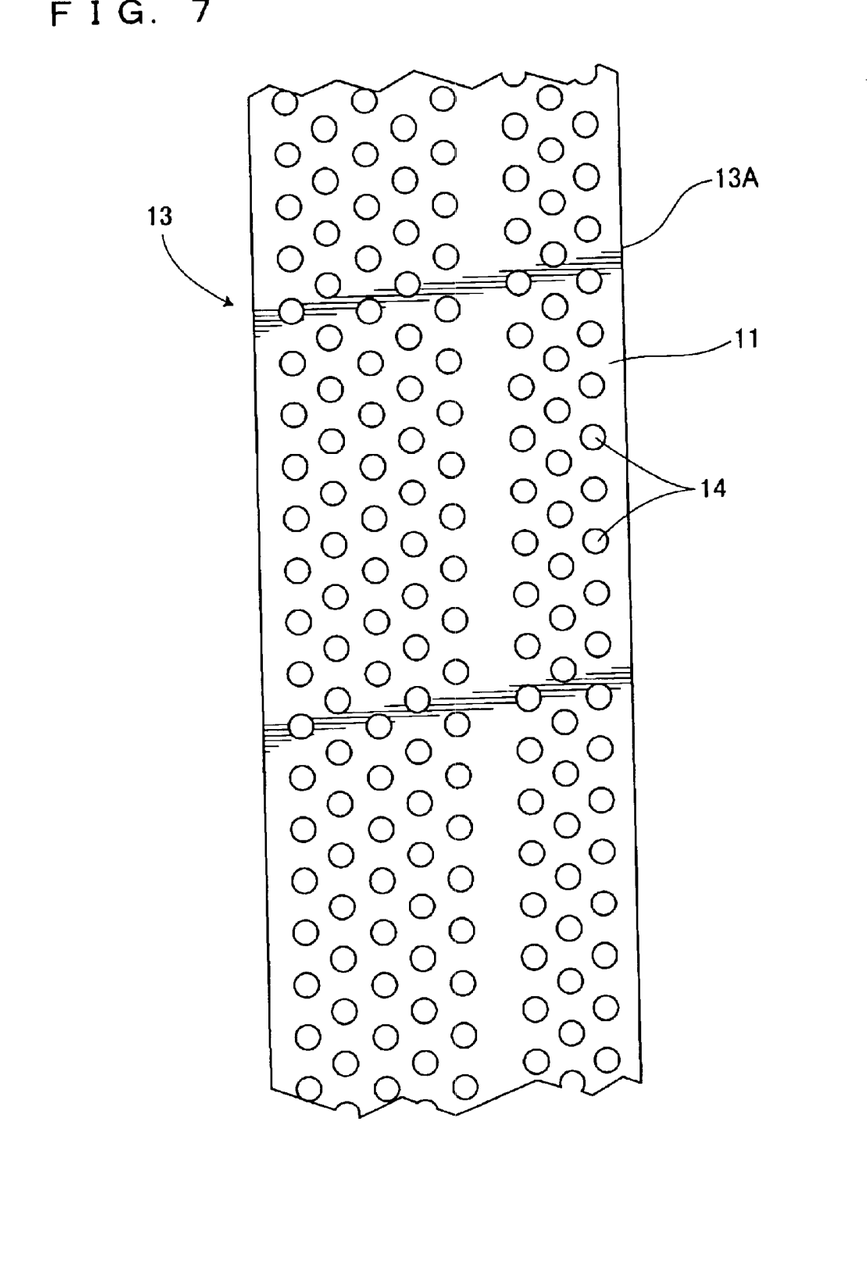
FIG. 7 is a development of an adhesive paper sheet illustrating the embodiment of the present invention.

Then, as shown in FIG. 6(D), after the adhesive 12 has solidified, the jig J is pulled out from the assembly interior of the permanent magnet cluster 3 supported by the jig J. At this time, because the resin type film F is polyethylene type, it does not attach to the epoxy resin type adhesive 12 allowing easy and clean removal. In addition, by removing the jig J, the permanent magnet 2 pairs repel each other, and a force is applied from the center of the permanent magnet cluster 3 towards the outside. However, by means of the adhesive paper sheet 13 that is attached and reinforced by the epoxy resin type adhesive 12 over the entire outer periphery of permanent magnet cluster 3, the outward force is resisted and by respectively bonding the spider 4, the permanent magnets 2, and the retainer 5, the permanent magnet cluster 3 becomes rigidly fastened to the spider 4 and the retainer 5.

In the embodiment constructed in this way, when an alternating current is passed through the electromagnetic coil 8, a force for moving the permanent magnets 2 in the axial direction X is applied by the resultant alternating magnetic field. Due to this force, the piston 9 installed concentrically with the unified magnet cluster 3, spider 4 and retainer 5, moves reciprocally in the axial direction X inside the cylinder 10.

By wrapping the adhesive paper sheet 13 that is cut according to pre-measurements so that it cannot overlap when wrapped, around the outer periphery of the spider 4, the retainer 5 and the cylindrically arranged permanent magnets 2, the adhesive paper sheet 13 is temporarily fixed to the permanent magnets 2, the spider 4 and the retainer 5 by the adhesive layer 11. Moreover, by applying and impregnating a small amount of adhesive 12 to the adhesive paper sheet 13 and causing it to solidify, the outer periphery of the spider 4, the retainer 5 and the permanent magnet cluster 3 is reinforced by the adhesive paper sheet 13. At this time, because the adhesive paper sheet 13 is the paper 13A, the cutting of the adhesive paper sheet 13 is easy, and this will not warp when wrapped. Also when the adhesive 12 is applied, fraying of the fiber will not occur. In addition, when the adhesive 12 is applied and impregnated, the adhesive 12 that has been applied will reach directly from the small holes 14 to the spider 4, the retainer 5 and the permanent magnets 2.

In this way, the above-mentioned embodiment is one having; the permanent magnet cluster 3 with plate like permanent magnets 2 cylindrically arranged, the spider 4 being a base end support and the annular shaped retainer 5 being a tip end support, for concentrically supporting the permanent magnet cluster 3, the outer laminated core 6 provided adjacent to the permanent magnet cluster 3, and the electromagnetic coil 8 wound around the outer laminated core 6. The adhesive paper sheet 13 having the adhesive layer 11 on the inner surface and which can be impregnated with the adhesive 12, is wrapped around the outer periphery of the permanent magnet cluster 3, the spider 4 and the retainer 5, and the permanent magnet cluster 3 is secured to the spider 4 and the retainer 5 by impregnating the adhesive 12 into the adhesive paper sheet 13 and solidifying. By wrapping the adhesive paper sheet 13 around the outer periphery of the spider 4, the retainer 5 and the cylindrically arranged permanent magnet cluster 3, the adhesive paper sheet 13 is temporarily fixed to the permanent magnets 2, the spider 4 and the retainer 5 by the adhesive layer 11. Moreover, by applying and impregnating a small amount of adhesive 12 into the adhesive paper sheet 13 and solidifying, the outer periphery of the spider 4, the retainer 5 and the permanent magnet cluster 3 is reinforced by the adhesive paper sheet 13. Therefore, not only can this be manufactured easily, it can also be constructed inexpensively. In addition, by cutting the adhesive paper sheet 13 to prior measurements so that it cannot overlap when wrapping, it is possible to stabilize the outer peripheral dimension of the spider 4 the retainer 5 and the permanent magnet cluster 3.

Moreover, the adhesive paper sheet 13 is one where the adhesive layer 11 is provided on the paper 13A, and not only is it easy to cut the adhesive paper sheet 13, but it does not cause distortion at the time of wrapping, and does not cause fraying of the fiber (pulp) when adhesive 12 is applied. Therefore it is possible to make the outer peripheral dimension of the spider 4, the retainer 5 and the permanent magnet cluster 3 more stable. Further, by using both lightweight and inexpensive paper for the adhesive paper sheet 13, the electromagnetic reciprocal drive mechanism can be constructed inexpensively.

Moreover, a plurality of small holes 14 are formed in the adhesive paper sheet 13 and the adhesive layer 11, and because the applied adhesive 12 directly and reliably reaches the spider 4, the retainer 5 and the permanent magnets 2 from the small holes 14, the permanent magnets 2, the spider 4 and the retainer 5 are reinforced more reliably and strongly.

Furthermore, for the adhesive 12 that impregnates the adhesive paper sheet 13, by using a type of epoxy resin type adhesive where the viscosity decreases markedly with heat, then by heating the adhesive 12 with an industrial drier, the adhesive 12 permeates thoroughly through the adhesive paper sheet 13, and even a small amount of adhesive 12 can permeate into the entire adhesive paper sheet 13.

Moreover, the present invention is not limited to the above embodiment, and various modifications are possible within the scope of the gist of the invention. For example, provided the above conditions are satisfied, materials other than paper, such as unwoven cloth, or porous film may be used.

The electromagnetic reciprocal drive mechanism of the invention has; the permanent magnet cluster with plate like permanent magnets cylindrically arranged, the support for concentrically supporting the permanent magnet cluster, the laminated core provided adjacent to the permanent magnet cluster, and the electromagnetic coil wound around this laminated core. The sheet having the adhesive layer on the inner surface and which can be impregnated with the adhesive is wrapped around the outer periphery of the permanent magnet cluster and the support, and the permanent magnet cluster is secured to the support by impregnating the adhesive into the sheet and solidifying. By wrapping the sheet around the outer periphery of the support and the cylindrically arranged permanent magnet cluster, the sheet is temporarily fixed to the permanent magnets and the support by the adhesive layer. Moreover, by applying and impregnating a small amount of adhesive into the sheet and solidifying, the outer periphery of the support and the permanent magnet cluster is reinforced by the sheet. Therefore, not only can this be manufactured easily, it can also be constructed inexpensively. In addition, by cutting the sheet to prior measurements so that it cannot overlap when wrapping, it is possible to stabilize the outer peripheral dimension of the support and the permanent magnet cluster.

Further, with the electromagnetic reciprocal drive mechanism of the invention, in the first aspect, the material of the sheet is paper, and not only is it easy to cut the sheet, but it does not cause distortion at the time of wrapping nor cause fraying of the fiber when the adhesive is applied. Therefore it is also possible to make the outer peripheral dimension of the support and the permanent magnet cluster more stable. Further, by using both lightweight and inexpensive paper for the sheet, the electromagnetic reciprocal drive mechanism can be constructed inexpensively. Moreover, with the electromagnetic reciprocal drive mechanism of the invention, in the first and second aspects, a plurality of small holes are formed in the adhesive paper sheet and the adhesive layer, and because the applied adhesive directly reaches the support and the permanent magnets from the small holes, the adhesive reliably reaches the support and the permanent magnets, and the permanent magnets and the support are reinforced more reliably and strongly.

What is claimed is:

1. An electromagnetic reciprocal drive mechanism having:
   a permanent magnet cluster with plate-like permanent magnets cylindrically arranged;
   a support for concentrically supporting said permanent magnet cluster in such a manner that said support is flush with said cluster;
   a laminated core provided adjacent to said permanent magnet cluster, and an electromagnetic coil wound around said laminated core;
   wherein a sheet having an adhesive layer on an inner surface and which can be impregnated with an adhesive is wrapped around an outer periphery of said permanent magnet cluster and said support, and said permanent magnet cluster is integrally secured to said support by impregnating an adhesive into said sheet and solidifying,
   wherein a material of said sheet is paper made of pulp.

2. A movable part for an electromagnetic reciprocal drive mechanism comprising:
   a permanent magnet cluster with plate-like permanent magnets cylindrically arranged;
   a support for concentrically supporting said permanent magnet cluster in such a manner that said support is flush with said cluster;
   wherein a sheet having an adhesive layer on an inner surface and which can be impregnated with an adhesive is wrapped around an outer periphery of said permanent magnet cluster and said support, and said permanent magnet cluster is integrally secured to said support by impregnating an adhesive into said sheet and solidifying,
   wherein a material of said sheet is paper made of pulp.

* * * * *